(12) United States Patent
Subbarayalu et al.

(10) Patent No.: US 8,602,430 B2
(45) Date of Patent: Dec. 10, 2013

(54) VEHICLE AIR SUSPENSION

(71) Applicants: Rajakumar Subbarayalu, Summerfield, NC (US); Gowthaman Subbarayalu, Fremont, CA (US)

(72) Inventors: Rajakumar Subbarayalu, Summerfield, NC (US); Gowthaman Subbarayalu, Fremont, CA (US)

( * ) Notice: Subject to any disclaimer, the term of this patent is extended or adjusted under 35 U.S.C. 154(b) by 0 days.

(21) Appl. No.: 13/694,273

(22) Filed: Nov. 15, 2012

(65) Prior Publication Data

US 2013/0147150 A1    Jun. 13, 2013

Related U.S. Application Data

(63) Continuation-in-part of application No. 13/066,318, filed on Apr. 13, 2011, now abandoned.

(51) Int. Cl.
*B60G 11/64* (2006.01)
*B60G 3/18* (2006.01)

(52) U.S. Cl.
USPC 280/124.162; 267/241; 267/32; 280/124.116; 280/124.153; 280/124.156; 280/124.157

(58) Field of Classification Search
USPC ........ 180/24.11, 24.13; 267/31, 32, 188, 230, 267/241, 256; 280/676, 682–684, 788, 789, 280/124.11, 124.111, 124.116, 280/124.128–124.132, 124.153, 124.156, 280/124.157, 124.162, 124.166, 124.167
See application file for complete search history.

(56) References Cited

U.S. PATENT DOCUMENTS

| | | | |
|---|---|---|---|
| 4,132,433 | A | 1/1979 | Willetts |
| 6,390,485 | B1 | 5/2002 | Cadden |
| 6,945,548 | B2 | 9/2005 | Dudding et al. |
| 7,168,718 | B2 | 1/2007 | Svartz |

*Primary Examiner* — Joseph Rocca
*Assistant Examiner* — Laura Freedman (57) ABSTRACT

A non-torque reactive trailing arm air suspension system for vehicle driven axle uses a spherical joint between trailing arm and axle as one of four nodes of four bar mechanism which is disposed on both sides of vehicle that maintains substantially constant pinion shaft angle during vehicle operation. The trailing arm is a rolled and formed beam of spring steel and utilizes a vertically resilient length between hanger bracket joint and axle joint to absorb road shocks.

18 Claims, 11 Drawing Sheets

VEHICLE AIR SUSPENSION

CROSS-REFERENCE TO RELATED APPLICATIONS

This application is a continuation-in-part of Ser. No. 13/066,318, filed 2011 Apr. 13 by the present inventors which is incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Rajakumar Subbarayalu Summerfield North Carolina
Gowthaman Subbarayalu Fremont Calif.

INCORPORATION-BY-REFERENCE OF MATERIAL SUBMITTED ON A COMPACT DISC

Not Applicable

BACKGROUND OF THE INVENTION

1) Field of the Invention

This invention relates to vehicle trailing arm air suspension system, more particularly to driven axles. Driven axles of trucks carry invariably an input shaft also called pinion shaft to which is connected a propeller shaft to transmit power from engine to differential assembly from where power is distributed to wheels on either sides of axle. A cardan type universal joint generally joins propeller shaft to pinion shaft. Angle of pinion shaft is set in a truck around an ideal design angle to achieve low included angle, called 'joint working angle', between propeller shaft axis and pinion shaft axis. During rotary power transmission from propeller shaft to pinion shaft, a low included angle will induce low rotational variation of pinion shaft that will in turn reduce inertial vibrations excited in the driveline system. Maintaining angle of pinion shaft axis around its set ideal design angle in various axle positions of jounce and rebound is a challenge when the trailing arm is clamped to axle. Change in pinion shaft axis angle from its ideal design angle will increase driveline induced vibrations in vehicle and also reduce life of driveline components. A substantially constant pinion shaft angle maintained around ideal design angle would result in low universal joint induced vibrations and longer life of parts in driveline.

During vehicle acceleration, coasting deceleration, and braking, a driven axle is subjected to equal and opposite torsional reactions, about axle lateral axis also called wheel axis, in response to drive torque and braking torque. Torsional resilience, about axle lateral axis, is generally incorporated in suspension systems. In a suspension where a trailing arm is "rigidly" clamped to axle, due to this torsional resilience, reaction torque on axle changes pinion shaft angle unless this reaction torque is suitably countered. A wide variety of prior art suspensions with objective of countering the reactive torque on axle based on four bar mechanism have been proposed and are examined in the following paragraphs.

2) Description of Related Art

In U.S. Pat. No. 7,168,718, Bjorn O. Svartz discloses a suspension where joint between lower control arm and axle is a pivot joint 31. All numbers in this paragraph refer to numbers used by Bjorn O. Svartz in U.S. Pat. No. 7,168,718 and has no equivalent relationship to invention disclosed herewith. He states in column 5 line 38 to 40, "The lower control arm passes under and is clamped to the rigid axle 6 by means of a pair of U-shaped clamps 27, 28." Since lower control arm is 'clamped' to rigid axle the pivot 31 will be an additional connection to axle making the pivoting action redundant. This would make the arrangement a rectangular structure of four links 21-31, 31-42, 42-43 and 43-21 than a mechanism. Even if some assistance is drawn from resilient bushes in joints, the suspension would lack sufficient travel of axle because of clamping lower control arm to rigid axle. As will be understood by those skilled in the art, in a trailing arm suspension, wherein axle is connected to trailing arm around its mid length and arm ends connected to frame either directly or through an air spring, the trailing arm can be equated to a simply supported beam. Substantially concentrated upward load is applied to trailing arm at axle connection while frame rail connections exert downward load. In such a beam, maximum bending moment occurs around the point of upward force application. Corresponding stress on the beam due to this bending moment will need to be borne by material around upward force application point. In a control arm like that of 20, material around load application point 31 experiences maximum bending moment. Having a through hole at this point in a trailing arm would weaken the region around the through hole. This is primarily because a pivot joint like 31 needs a through hole in the trailing arm to receive pin or bush to be connected to axle.

In his U.S. Pat. No. 4,132,433, Willetts proposes a vehicle suspension wherein a trailing arm, mentioned as longitudinally-extending beam member 420, is connected to a rigid axle by a pivot joint as seen in his FIG. 2 and FIG. 3. To accommodate this pivot and outer sleeve 452, the trailing arm has a through hole as shown in his FIG. 3. This hole in trailing arm has the disadvantage of weakening the section of beam around the pivot joint.

Dudding et al. proposes a non-reactive trailing arm air suspension via U.S. Pat. No. 6,945,548 that has a pivot joint between trailing arm and axle. The trailing arm has a through bore at pivot joint 36 between trailing arm and axle where the highest bending moment would be experienced by the trailing arm.

Another feature generally found in prior art non-reactive trailing arm air suspensions that have a pivoted trailing arm front end is, the portion of trailing arm between front pivot and axle joint is vertically non-resilient. While air spring and shock absorber, which are generally disposed rearward of axle in such a trailing arm air suspension of a driven axle, substantially absorb shocks and energy by way of work done at the rear end of trailing arm, not enough energy is absorbed in suspension portion forward of axle. Elastomeric bushing in the front pivot absorbs very marginal energy as negligible work is done at that pivot. The joint between trailing arm and frame hanger bracket invariably experiences shocks that are transmitted to suspended mass causing occupant discomfort and requiring additional measures to counter negative effects of shocks on suspended mass.

In U.S. Pat. No. 6,390,485, Robert L. Caden describes a trailing arm air suspension wherein trailing arm is connected to axle by a pivot joint 56 that is outside the trailing arm body which is desirable as the trailing arm does not have a through hole. This also has the advantage of absorbing shocks both forward and rearward of axle. Robert achieves the non-torque reactive aspect of suspension by a mechanism built by an upper torque rod 74 for first link, a combination of frame and hanger bracket for the second link, a lower torque rod for the third link and axle for the fourth link. The torque rods 74 and its associated mounting brackets can be avoided if the front portion of trailing arm is made to function as a link that counters reaction torque.

Therefore in a non-torque reactive trailing arm suspension, it is desirable not to have a through hole in the trailing arm around the area where trailing arm connects to axle, to avoid structural weakening of trailing arm.

It is further advantageous to have a non-torque reactive trailing arm air suspension wherein substantial energy absorption takes place forward of axle by the trailing arm which trailing arm portion between axle joint and hanger bracket joint functions as one link of a four links mechanism, which mechanism achieves non-torque reactive aspect of suspension.

One of the objectives of this invention is to provide a non-torque reactive trailing arm air suspension wherein is provided a trailing arm which mid-portion that is connected to axle does not have a through hole as a means for connecting to axle.

Another objective of this disclosure is to provide a non-torque reactive trailing arm air suspension that is based on four bar mechanism that uses a spherical joint between axle and trailing arm, which spherical joint acts as one of four nodes of four bar mechanism and which spherical joint does not require the trailing arm to have a through hole.

Yet another objective of this invention is to provide a non-torque reactive trailing arm air suspension that uses a rolled and formed trailing arm which trailing arm first end is connected to hanger bracket by a pivot joint and uses the length of rolled and formed trailing arm between hanger bracket pivot joint and trailing arm axle joint as one of four links of four bar mechanism, which link portion has a partial length of trailing arm that is vertically resilient.

A 'torque reactive' trailing arm air suspension functionally attached to a driven axle has a pair of trailing arm assemblies, comprising pairs of hanger brackets, trailing arms, their attachments to axle and hanger brackets, air springs and shock absorbers. Front end of trailing arm of each assembly is generally pivotally connected to hanger bracket or longitudinally sliding and vertically restrained in hanger brackets. In the version of longitudinally sliding front end of trailing arm, the axle is connected to hanger bracket generally by additional tie link between axle and hanger bracket. This additional tie link is generally pivotally connected to hanger bracket and axle. Middle portion of trailing arm is generally "rigidly" clamped to one side of axle or pivotally connected to axle. The trailing arm generally extends behind axle where it is connected to one end of an air spring and to one end of a shock absorber. Other ends of air spring and shock absorber are connected to frame rail. Front portion of trailing arm bears partial suspended weight of vehicle. Rear portion of trailing arm bears partial suspended weight of vehicle through the air spring that is connected to frame rail. Rigidly clamped attachment of trailing arms to axle combined with pivoted or vertically-restrained-sliding of front end of trailing arm in the hanger bracket makes the suspension inherently reactive to torque induced by traction force and wheel braking torque. Due to resilience in the suspension system, this reaction on axle changes pinion shaft angle of driven axle. Effect of reaction on axle is more pronounced during vehicle acceleration from stop and during vehicle hard braking. While it is an industry practice to set angle of pinion shaft to its ideal design angle that substantially cancels joint working angle of all cardan joints in driveline system, a 'rigidly axle mounted trailing arm set up' generally does not maintain factory set pinion shaft angle during jounce and rebound of axle and during acceleration and braking.

In prior an 'torque reactive' trailing arm air suspensions where the trailing arm is rigidly clamped to axle, structural strength of trailing arm is preserved but the suspension is rendered 'torque reactive'. In prior art 'non-torque reactive' a trailing arm air suspensions where the trailing arm uses a through hole as a means of pivotally connecting trailing arm to axle, the region around the hole experiences substantially high bending stress and the presence of through hole around that area further weakens the structure. In prior art non-torque reactive trailing arm air suspensions where the trailing arm does not have through hole but pivotally connects trailing arm to axle, an additional link and its mounting brackets are required to make a non-torque reactive suspension.

BRIEF SUMMARY OF THE INVENTION

The disclosed invention is a vehicle trailing arm air suspension system and more particularly a truck driven axle air suspension system. One of the preferred embodiments of this invention is based on 'four bar mechanism' also called 'four link mechanism', the four links are represented by 1) a hanger bracket, 2) a link rod, 3) driven axle along with its attachments to connect mid-portion of trailing arm and second end of link rod and 4) a trailing arm of preferably spring steel. The invention uses a spherical joint constructed to spherically connect trailing arm and axle which joint is one of four joints of four bar mechanism. The invention as applied to a single driven axle comprises a pair of trailing arm assemblies each disposed on both sides of vehicle. Each assembly comprises a hanger bracket, a trailing arm with its attachments to hanger bracket and axle, a link rod with its attachments to hanger bracket and axle, an air spring and a shock absorber. It must be noted that 'longitudinal direction' means the direction of normal vehicle travel, 'axle' means the axle assembly consisting of a driven-axle with attachments that are necessary on the axle to connect to trailing arm and link rod. Also it must be noted that 'frame' or 'vehicle frame' means a frame assembly consisting of oppositely spaced and longitudinally oriented frame rails that are parallel to each other and connected by a series of transversely oriented cross members functionally attached to the inboard side of frame rails along their length. 'Rolled' means a metal working process in which a part is shaped to required form by repeatedly passing a preformed metal part between rollers till the required form is obtained. 'Formed' means the process in which a shape of a part is obtained by such operations as bending, drawing that does not require removal of material. The term 'node' means the joining point or axis of two links in a mechanism.

A hanger bracket is rigidly attached to outboard of the frame rail by a plurality of fasteners. Trailing arm is a longitudinally disposed beam of varying rectangular section of solid spring steel having a formed hole at its first end, a mid-portion and a second end. Trailing arm has a vertically resilient part between first end and mid-portion. In the preferred embodiment the trailing arm is provided with a step near to the second end to accommodate an air spring between second end and frame rail. First end of the trailing arm is pivotally connected to top of hanger bracket. The axes of pivots as discussed in this invention are generally perpendicular to a longitudinal vertical plane. In this text a longitudinal vertical plane is an imaginary plane that is oriented vertically in the direction of vehicle motion. The pivoted connection between the first end of the trailing arm and the hanger bracket acts as one of four nodes of four bar mechanism.

Mid-portion of the trailing arm is "spherically" connected to top of driven axle providing a spherical joint between mid-portion of trailing arm and top of axle. A spherical segment-top and a spherical segment-bottom are each made out of hemispherical steel blocks of suitable size. On the base of each hemispherical block is provided a centrally located through-slotted cavity, its web parallel to base, its depth from base of hemisphere being substantially equal to half vertical height of mid-portion of trailing arm and its width being substantially equal to horizontal lateral width of mid-portion of trailing arm. These slot cavities cooperatively receive half vertical thickness of the mid-portion of trailing arm when the slotted hemispherical blocks are fastened base to base to form a slotted sphere around mid-portion of trailing arm. The web surface of the slots in the spherical segments are keyed to their corresponding horizontally disposed matching surfaces on mid-portion of trailing arm to prevent relative movement between the spherical segments and the trailing arm. The spherical segment-top and spherical segment-bottom are preferably fastened together at inboard and outboard sides of the trailing arm. A block-top and a block-bottom each made out of rectangular steel block are provided with hemispherical cavities to cooperatively receive corresponding spherical segments when assembled base to base. Suitable slots are provided in the blocks to have sufficient clearance around trailing arm during operation. The blocks together are rigidly attached to top of axle by clamping them to the axle preferably using two U-shaped bolts one each on inboard and outboard of trailing arm. All four spherical surfaces of spherical segments and blocks have a common center. Required clearance is provided between the spherical cavities of the blocks and spherical surfaces of the segments to allow for suitable journal bushing.

Sliding clearance is provided between the segments and bushings. The arrangement forms a limited articulation spherical joint between axle and mid-portion of trailing arm. The center of the spherical joint thus formed act as one of four nodes of four link mechanism.

A link rod is disposed between hanger bracket and axle. First end of a link rod is pivotally connected to bottom end of hanger bracket. Other end of link rod is pivotally connected to a bottom bracket which bottom attached to bottom of axle with the same U-shaped bolts used to clamp blocks to axle. Bottom bracket has holes to receive pins to pivotally connect second end of link rod to bottom bracket. The link rod forms one of the links of four bar mechanism and its pivoted ends form two nodes of four bar mechanism.

In operation, the hanger bracket functions as 'ground link' of the four bar mechanism. Axle, with its connections to trailing arm and link rod, functions as the 'driven link' of four bar mechanism. Four bar mechanism thus formed is geometrically arranged to achieve required ideal design angle of pinion shaft. Lengths of opposite links are preferably maintained equal to achieve substantially constant pinion shaft angle during jounce and rebound motion of axle. This arrangement of four bar mechanism makes the axle substantially non-reactive to drive torque and brake torque. Drive torque and brake torque induced reactive torque on axle, about axle axis, are substantially countered by the link rod and the portion of trailing arm between spherical joint and pivoted first end of trailing arm. Second end of trailing arm is connected to one end of an air spring and to one end of a shock absorber. Other end of the air spring and the shock absorber are connected to the frame rail. To control the lateral motion of the axle during jounce and rebound, one end of a tie rod is pivotally attached to the frame rail and the other end of the tie rod is pivotally attached to the axle. Vertically resilient portion of trailing arm between first end and mid-portion and air spring act as energy absorption elements of suspension.

DETAILED DESCRIPTION OF THE INVENTION

Figure 1:
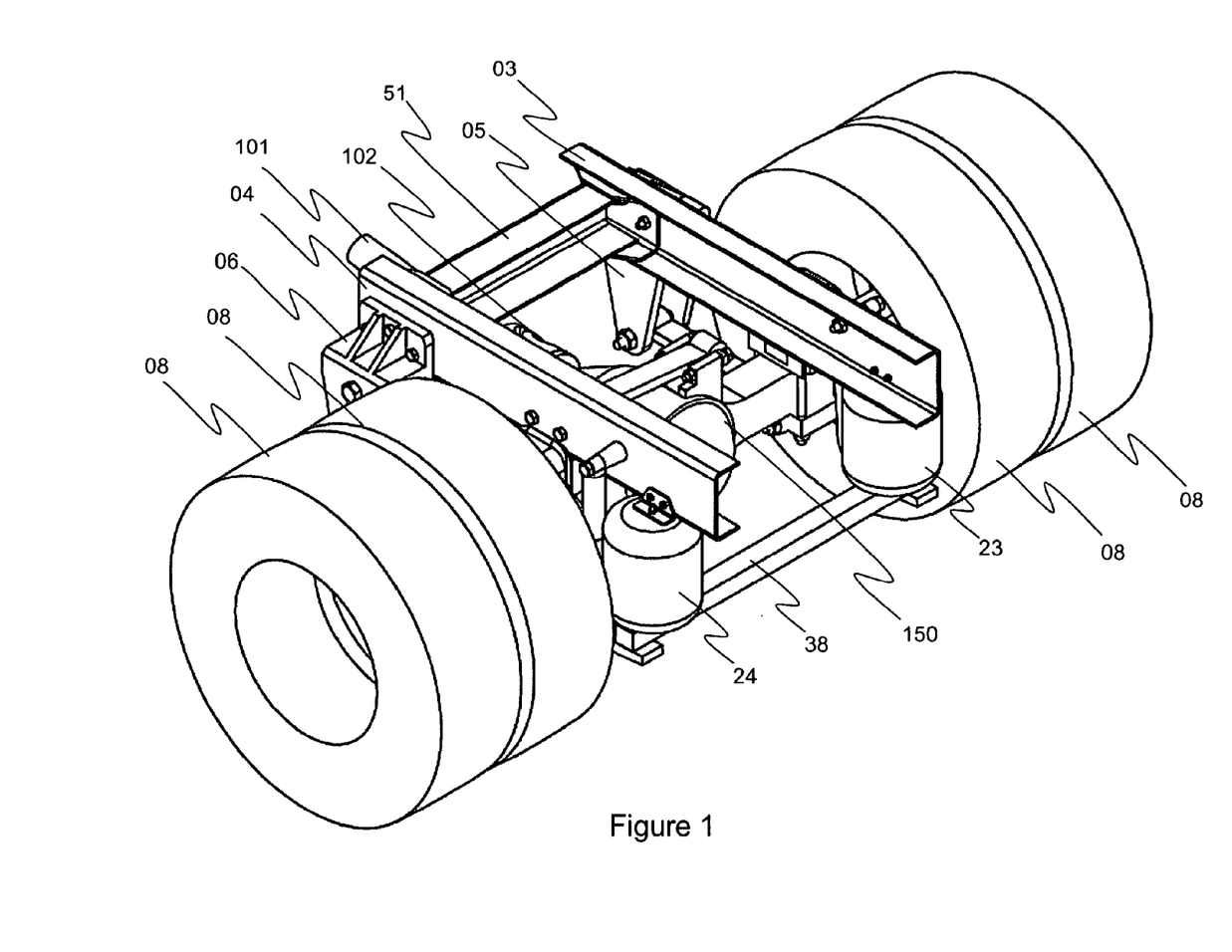
FIG. 1 is a perspective view illustrating the trailing arm suspension according to the present invention pertaining to a single driven axle shown assembled on a truck frame.

FIG. 1 illustrates portion of truck chassis showing general arrangement of the suspension according to the invention as applied to a single driven axle. Frame rails 03 and 04 are parallel and oppositely spaced steel channels, their longer dimension, length, oriented longitudinally in the direction of normal drive motion of truck. Frame rails 03 and 04 are joined laterally by multiplicity of cross members fastened to inboard sides of frame rails 03 and 04. Only the cross member 51 relevant to suspension is shown. Hanger brackets 05 and 06 are shown mounted to out-board sides of frame rails 03 and 04. Propeller shaft 101 is shown connected to driven axle 150 by a cardan type universal joint 102. Wheels 08 are shown mounted on either side of axle 150. During vehicle operation, power from vehicle's power source (not shown) is transmitted to wheels through a multiplicity of propeller shafts (not shown) between power source and propeller shaft 101 and through gears (not shown) in driven axle 150. Driven axle 150 contains the pinion shaft (not shown) which is in the path of power transmission to wheels 08.

Figure 2:
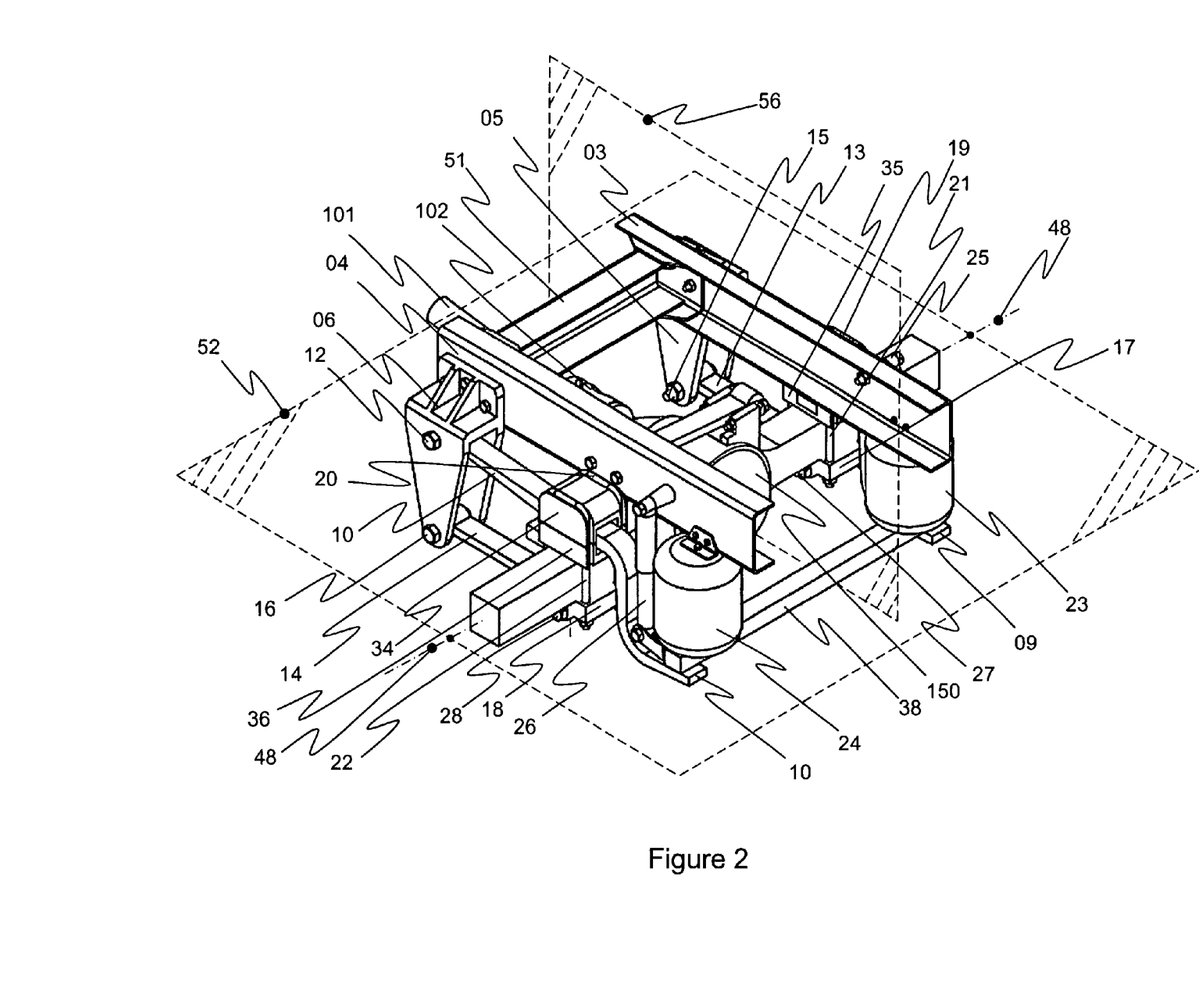
FIG. 2 is a perspective view illustrating the trailing arm suspension according to the present invention pertaining to a single driven axle without tires, shown assembled on a truck frame.

FIG. 2 illustrates portion of truck showing general arrangement of the suspension according to the invention applied to a single driven axle 150 shown without wheels. 56 is a longitudinal vertical plane oriented in the direction of vehicle drive motion passing through vehicle lateral center. Components are numbered such that odd numbers represent those parts belonging to right hand side trailing arm assembly and even numbers represent parts belonging to left hand side trailing arm assembly with the exception of 150, 101, 102, 51, 38, 48, 52, and 56. The pairs of numbers after the occurrence of another pair of numbers in a sentence in this text need to be considered as being in order respectively. Hanger brackets 05,06 are rigidly attached to the outboard sides of frame rails 03,04 respectively by a plurality of fasteners. The fasteners also fasten a cross member 51 between frame rails. First end 41, 42 (FIG. 4) of trailing arm 09,10 are shown pivotally connected to top of hanger brackets 05,06 by pivot pins 11(not visible in the Figure) and 12. The axes of pivot pins 11 and 12 are substantially collinear, and substantially perpendicular to the longitudinal vertical plane 56. First end of link rods 13,14 are shown connected to lower end of the hanger brackets 05,06 by pivot pins 15,16. Axes of pivot pins 15,16 are substantially collinear, and substantially perpendicular to the longitudinal vertical plane 56. Second end of link rods 13,14 are pivotally connected to bottom brackets 17,18 by pins 27,28 respectively. Axes of pivot pins 27,28 are substantially collinear and substantially perpendicular to the longitudinal vertical plane. Bottom brackets 17,18 are rigidly attached to lower portion of axle 150 one on each side of axle by U-shaped bolts 19, 21 on the right side and 20, 22 on the left side. A second end 45, 46 of the trailing arms 09,10 is attached to one end of air springs 23,24 by suitable bracketry and fasteners. One end of shock absorbers 25, 26 is attached to the second end 45, 46 of trailing arm 09,10 by suitable bracketry and fasteners. Second end of the air springs 23,24 and second end of shock absorbers 25 and 26 are attached to frame rails 03,04 by suitable bracketry and fasteners. The figure also illustrates axle axis 48 extending from left to right of axle 150.

Figure 3:
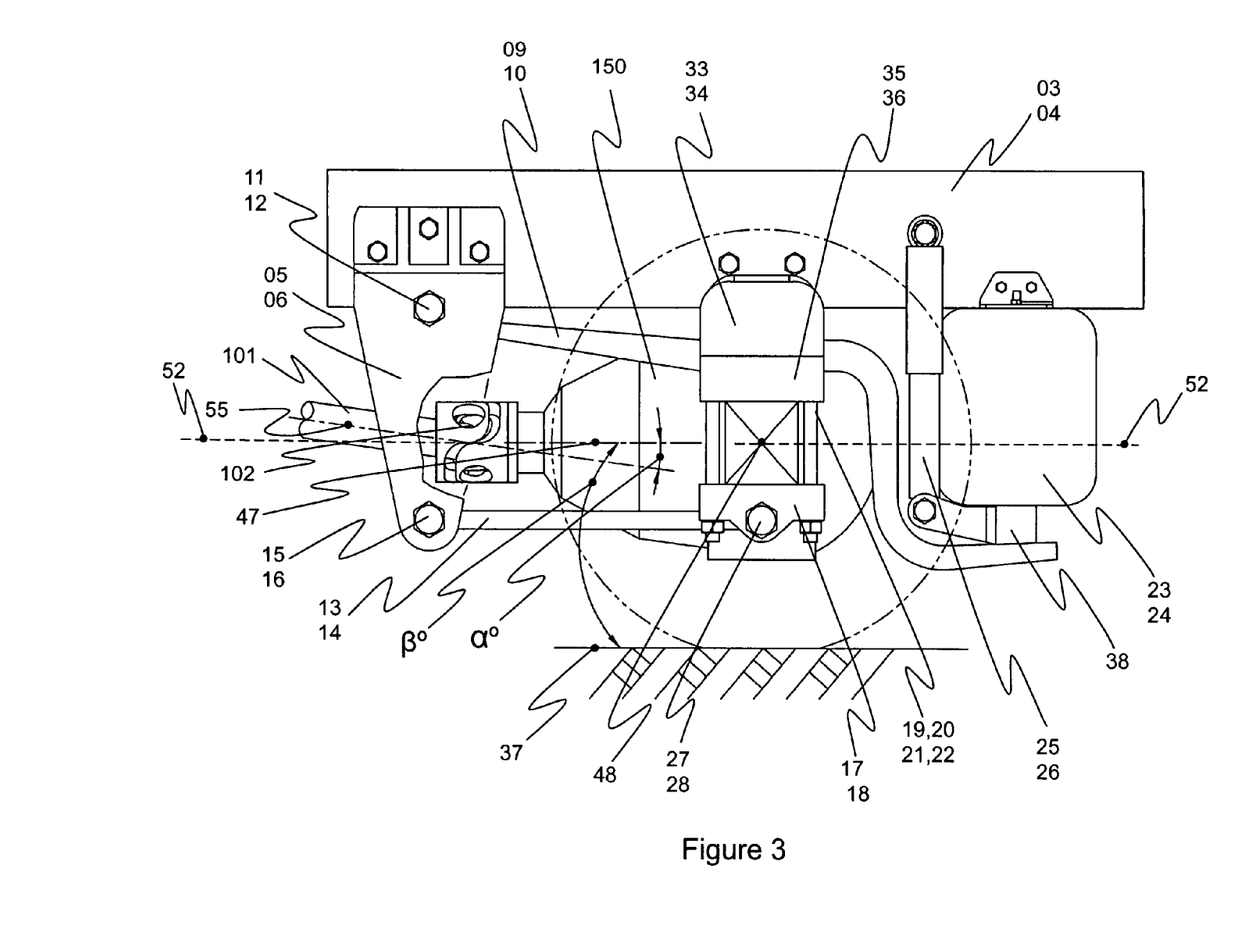
FIG. 3 is a view of the invention pertaining to a single driven axle viewed from left side of truck.

FIG. 3 illustrates side view of general arrangement of the invention as applied to single driven axle 150, viewed from left hand side of vehicle. In the drawing, front of vehicle is to the left and rear of vehicle is to the right. Components are numbered such that odd numbers represent those parts belonging to right hand side trailing arm assembly and even numbers represent parts belonging to left hand side trailing arm assembly with the exception of 150, 101, 102, 37, 38, 47, 48, 52, and 55. This illustration need to be correlated with FIG. 4 for better understanding. Pinion shaft axis 47 is generally in the fore aft direction parallel to the longitudinal vertical plane 56. Pinion shaft axis 47 is set at an angle β° in reference to horizontal ground plane 37 to achieve required 'joint working angle' α° between propeller shaft axis 55 and pinion shaft axis 47. In the figure the pinion shaft axis is shown horizontal, though the orientation varies according to various vehicle requirements. Hanger bracket 06 is shown partially cut for the purpose of showing universal joint 102. Horizontal plane 52 that is represented by a dashed line in this view is shown passing through axle axis 48.

Figure 4:
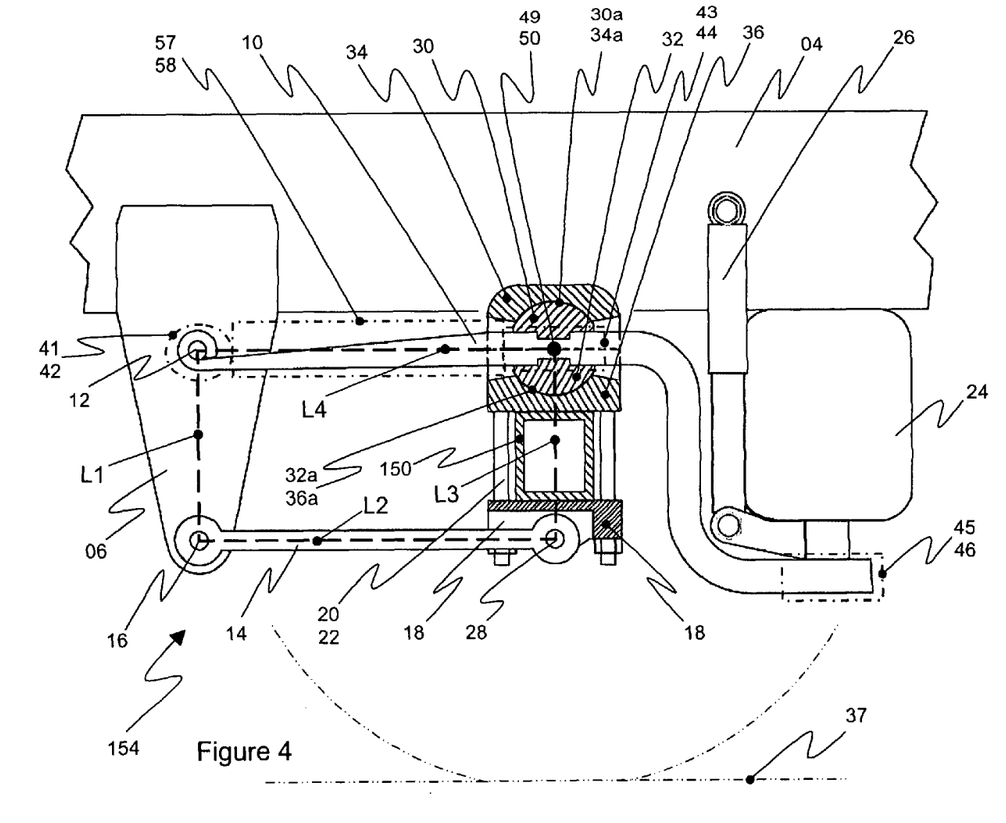
FIG. 4 is the longitudinal vertical section of the invention through the spherical joint center 50.

FIG. 4 shows partial view of section through a plane parallel to longitudinal vertical plane 56 and passing through nodal center 50 of spherical joint which is formed between trailing arm 10 and axle 150. Odd numbers represent those parts that belong to right hand side trailing arm assembly with exception of axle 150, and even numbers represent those parts belonging to left hand side trailing arm assembly. In this figure front of vehicle is towards left. For sake of clarity, only left side trailing arm suspension assembly is illustrated. This figure shows connection details of mid-portion 44 of trailing arm 10 to top of axle 150 by an assembly comprising trailing arm 10, block-top 34, block-bottom 36, spherical segment-top 30 and spherical segment-bottom 32. The illustration shows suspension assembly 154 comprising hanger bracket 06, pin 12, trailing arm 10, segment-top 30, segment-bottom 32, block-top 34, block-bottom 36, U-shaped bolts 20,22, bottom bracket 18, pin 28, link rod 14, pin 16, air spring 24 and shock absorber 26. The suspension assembly 154 is shown attached to left frame rail 04. Suspension assembly 154 is also shown connected to axle 150 using U-shaped bolts 20,22 and a plurality of nuts at the bottom of U-shaped bolts. The portion of trailing arms 09,10 between 41,42 and 43,44 is the vertically resilient portion 57,58 of the trailing arms. To highlight the purpose of FIG. 4, the details of fastening hanger bracket to frame rail 04 are not shown. Air spring 24 is disposed between second end 46 of trailing arm 10 and frame rail 04. Shock absorber 26 is shown disposed between second end 46 of trailing arm and frame rail 04. In the illustration, spherical segment-top 30 and spherical segment-bottom 32 are shown keyed in matching depressions in trailing arm 10. Convex spherical surface '30a' of segment-top 30 cooperatively engages with matching concave spherical surface '34a' in block-top 34. Similarly, convex spherical surface '32a' of spherical segment-bottom 32 cooperatively engages with concave spherical surface '36a' in block-bottom 36. Suitable spherical shapes of bushing (not shown) material interface between spherical surfaces of segment-top 30 and block-top 34 and between spherical surfaces of segment-bottom 32 and block-bottom 36. Spherical surfaces 30a, 34a, 32a and 36a in the assembly are arranged to have a common center point 50. This ensures the assembly acts as a single spherical joint. Unlike a pivot joint which has one degree of rotational freedom about an 'axis', a spherical joint has three degrees of rotational freedom about a 'point'(50). FIG. 4 also illustrates the four bar links. Distance between pin 12 and pin 16 of hanger bracket 06 represents ground link L1 of four bar mechanism. Dimension of link rod 14 between pin 16 and pin 28 represents second link L2. Distance between pin 28 and spherical joint center 50 on top of axle 150 represents driven link L3. Link L3 is formed by bottom bracket 18, axle 150, block-bottom 36, block-top 34, segment-bottom 32, segment-top 30, mid-portion 44 of trailing arm of which 18, 150, 36, and 34 are clamped together as shown by U-shaped bolts 20,22. The four bar mechanism is completed by link L4 formed between nodal center 50 of spherical joint and pin 12. Pin 12 forms the first pivot joint between first end 42 of trailing arm and hanger bracket 06, pin 16 forms the second pivot joint between hanger bracket and one end of link rod 14, pin 18 forms the third pivot joint between other end of link rod 14 and axle 150 by cooperatively disposed bottom bracket 18. Fourth node of the four bar mechanism is the spherical joint center point 50 formed between trailing arm 10 and axle 150 with cooperatively disposed segments 30,32 and blocks 34,36 and mid-portion 44 of trailing arm 10. First ends 41,42 of trailing arm 09,10, vertically resilient front portion 57, 58 of trailing arms and second ends 45, 46 of trailing arms are shown.

Figure 5:
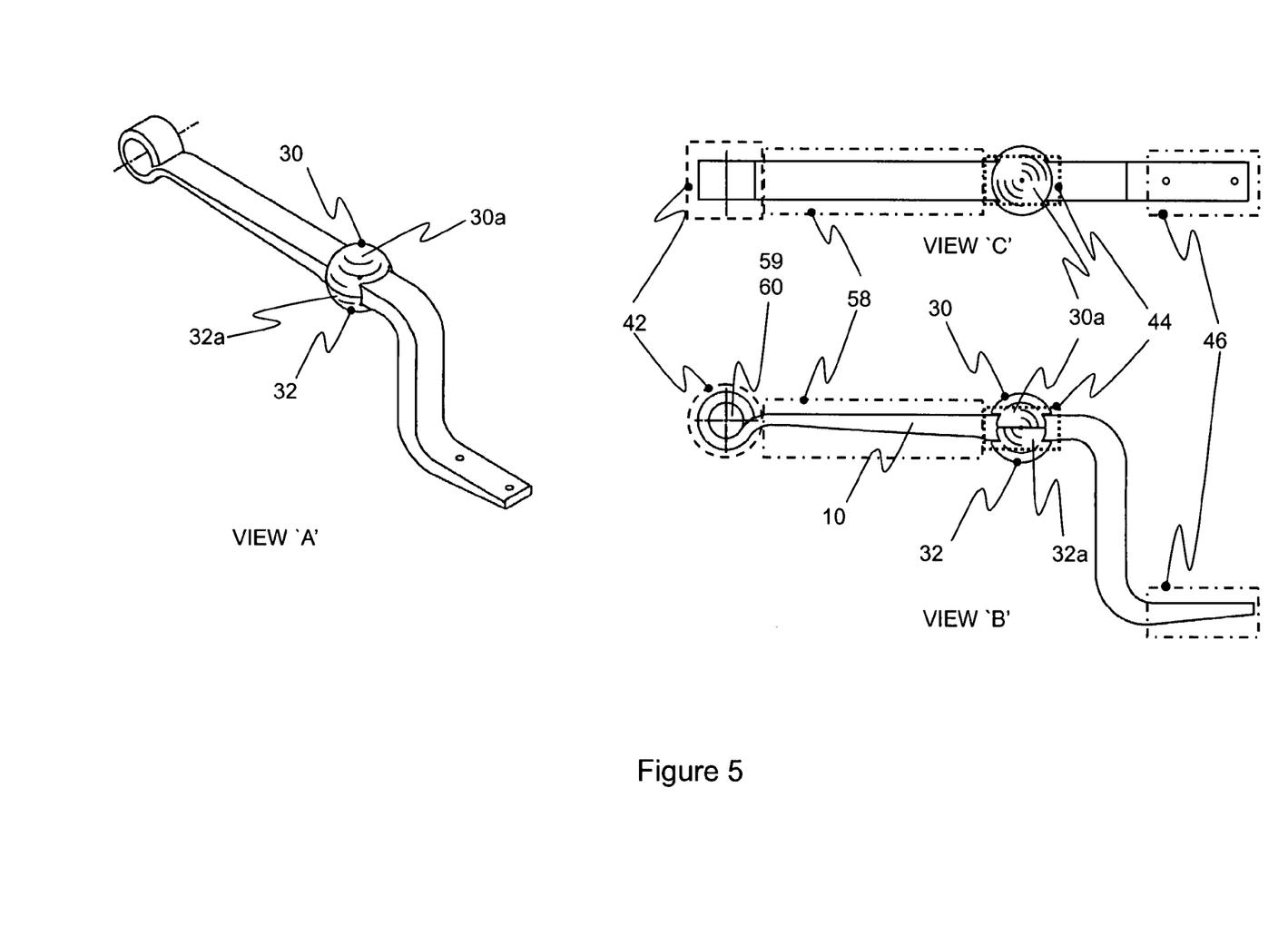
FIG. 5 illustrates the perspective View' A', side view 'B' and top view 'C' of an assembly comprising trailing arm, segment-top and segment-bottom. The figure illustrates segment-top and segment-bottom assembled to mid-portion of the trailing arm.

FIG. 5 illustrates the trailing arm 10, segment-top 30 and segment-bottom 32 assembled together. Spherical surface 30a of segment-top and spherical surface 32a of segment-bottom is shown in this figure. In this illustration the spherical surfaces 30a and 32a are convex in shape. The figure also shows front end 42 with formed hole 60, mid-portion 44 and second end 46 of the trailing arm. Hole 59 represents that of right hand trailing arm.

Figure 6:
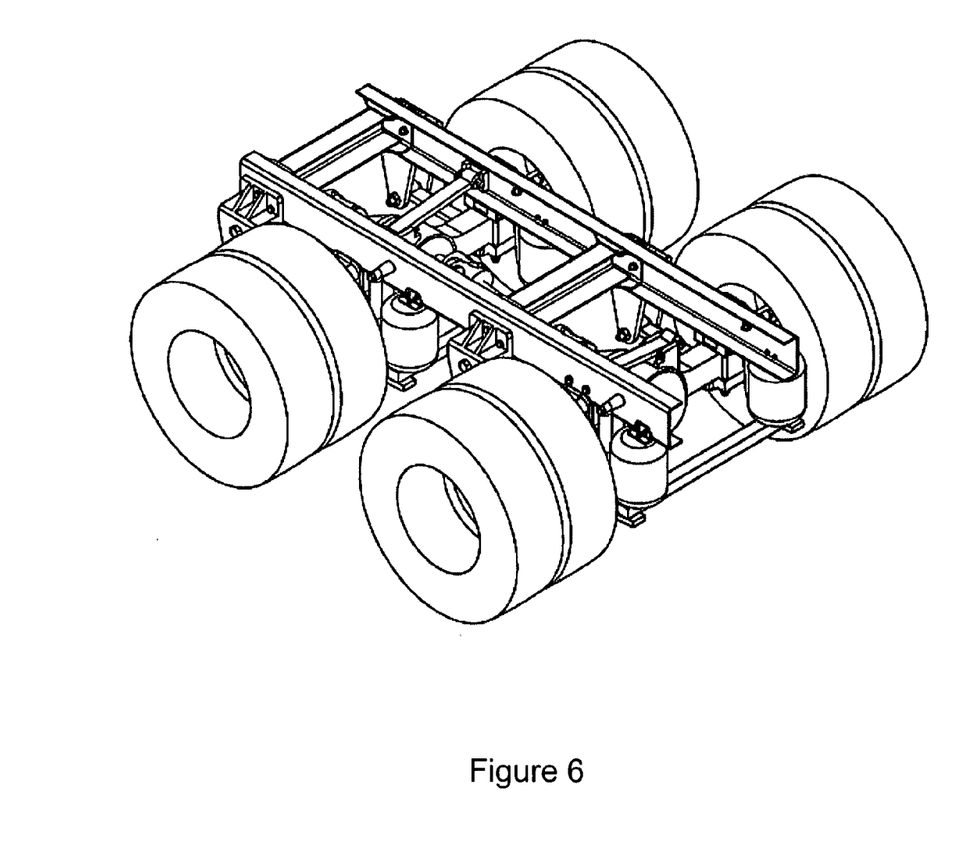
FIG. 6 is the perspective view of the invention pertaining to a tandem driven axle shown assembled on a truck frame when viewed down at an angle.
Figure 7:
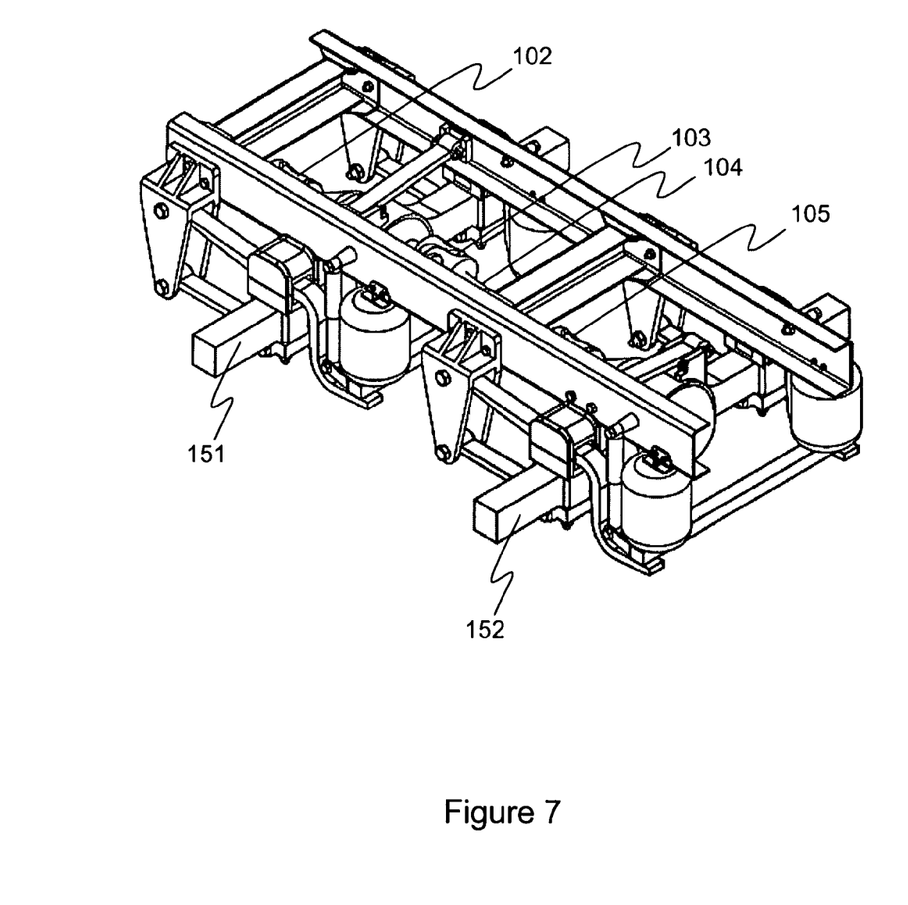
FIG. 7 is the general view of the invention for a tandem driven axle without tires shown assembled on a truck frame.

FIG. 6 Figure illustrates portion of truck showing general arrangement of the invention on tandem driven axles. The suspensions in these axles are akin to that of single driven axle and definitions and assembly arrangements are common to single driven axle suspension FIG. 7 illustrates portion of truck showing general arrangement of the suspension on tandem driven axles without tires. The figure shows the first driven axle 151 and second driven axle 152 connected at universal joints 103 and 105 by an inter axle propeller shaft 104. Suspension in these axles are akin to that of single driven axle and definitions and assembly arrangements are common to single driven axle suspension.

Figure 8:
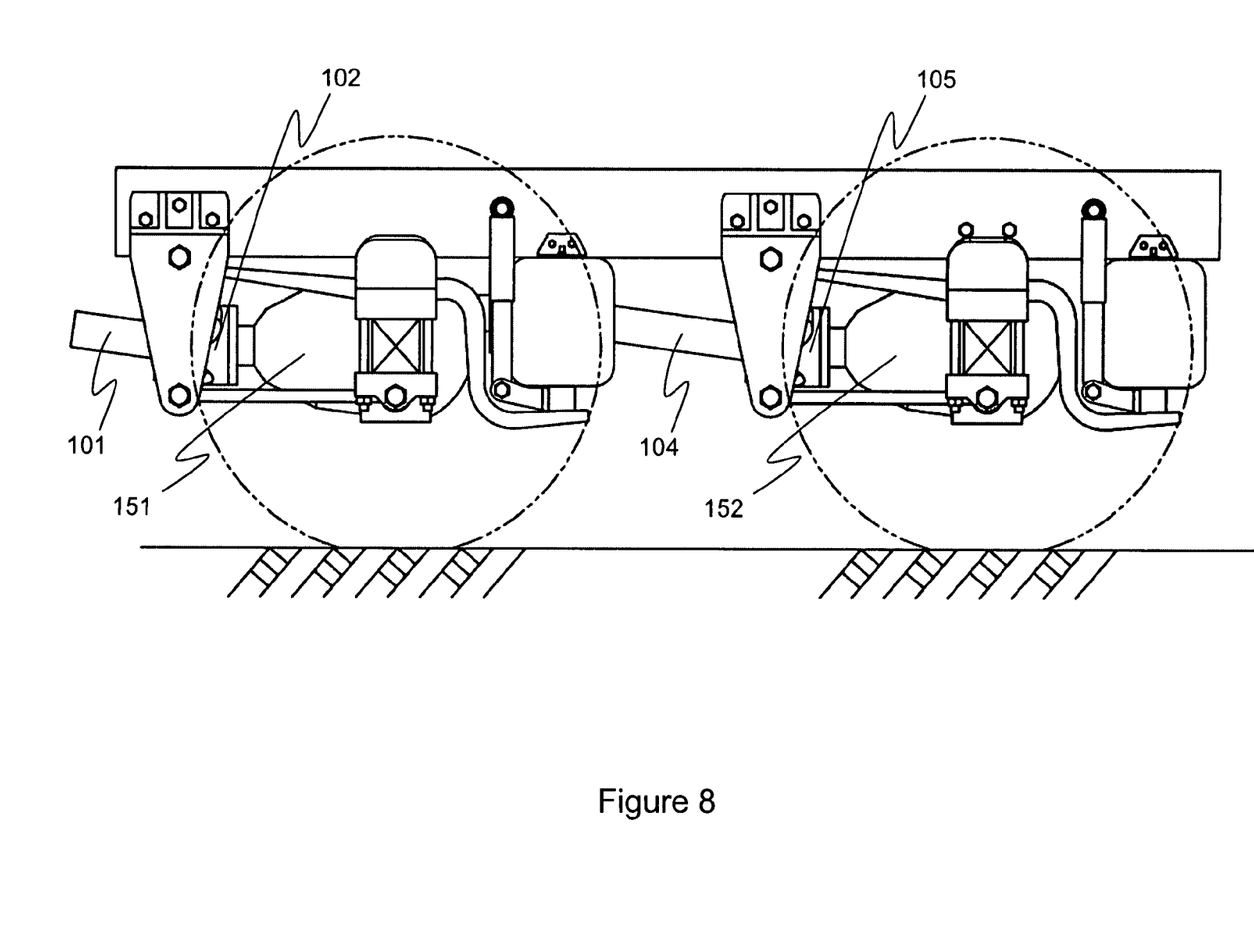
FIG. 8 is the left side view of the invention for a tandem driven axle, with axle and inter-axle propeller shaft.

FIG. 8 illustrates the left side view showing general arrangement of the suspension on tandem driven axles.

Figure 9:
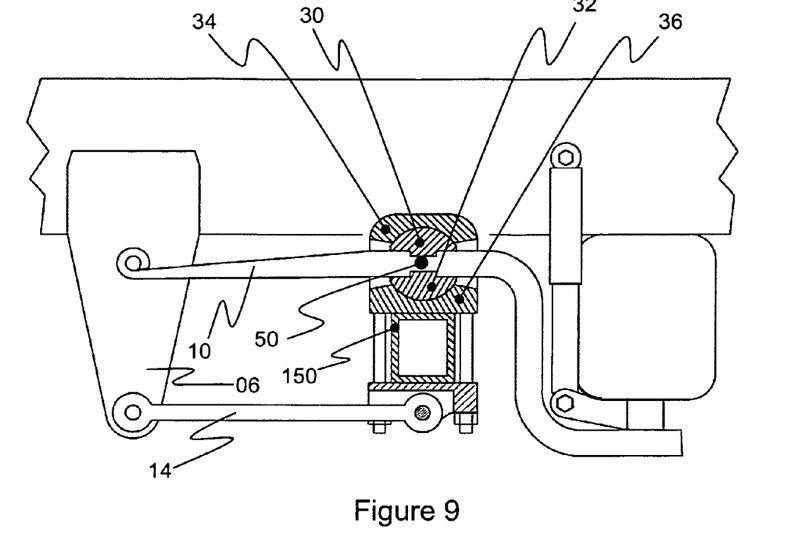
FIG. 9 through 14 shows longitudinal vertical sections of various embodiments of the invention as contemplated presently.

FIG. 9 shows one of the preferred embodiments of the invention. This is an over slung suspension arrangement wherein the trailing arm is above axle 150. In this embodiment, the spherical joint center 50 is above the axle 150. This embodiment is the same as explained in FIG. 4. The spherical joint is formed by two convex spherical surfaces of spherical segment-top 30 and segment-bottom 32 and two concave spherical surfaces of block-top 34 and block-bottom 36.

Figure 10:
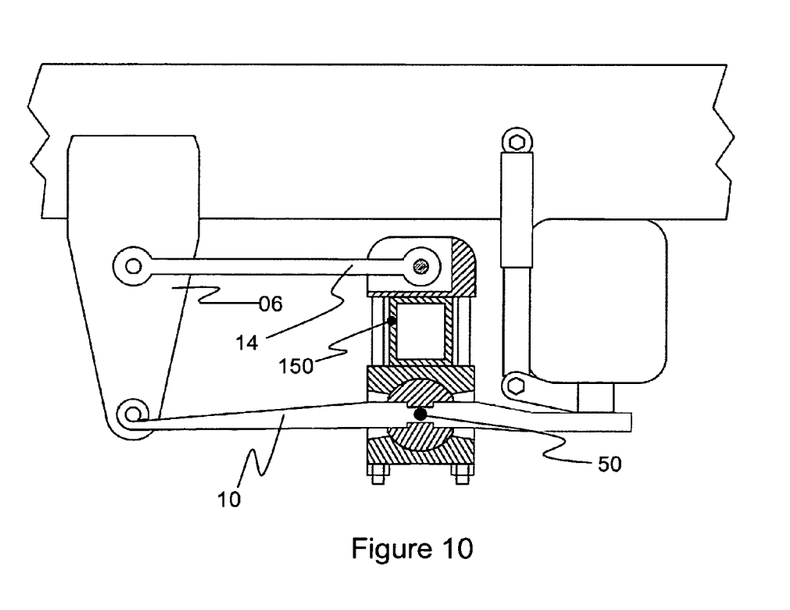

FIG. 10 shows a variant of embodiment in FIG. 9 wherein the trailing arm 10 is under slung on axle 150. In this embodiment the spherical joint center 50 is below the axle 150.

Figure 11:
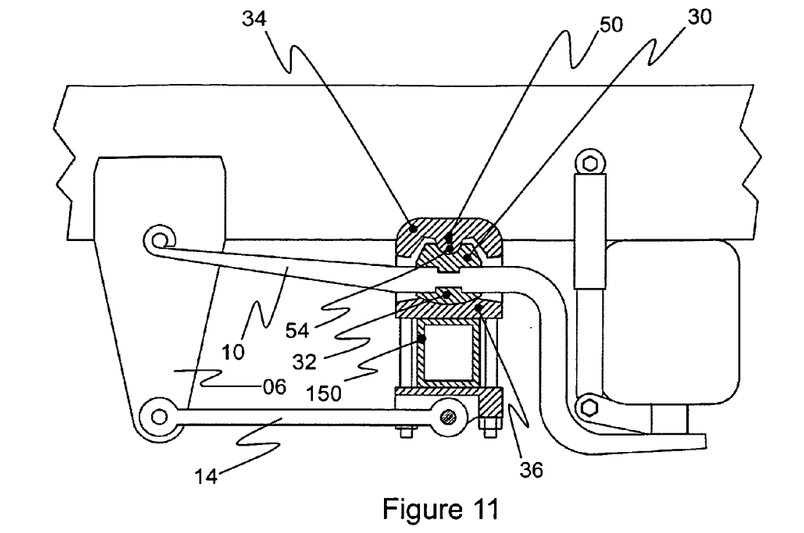

FIG. 11 shows another embodiment of the invention where the spherical joint center 50 is above axle 150 and above the over slung trailing arm. In this arrangement the block-top 34 has a spherical projection 54 cooperatively engaging with spherical cavity in spherical segment-top 30. Spherical segment-bottom 32 cooperatively engages with spherical surface of block-bottom 36.

Figure 12:
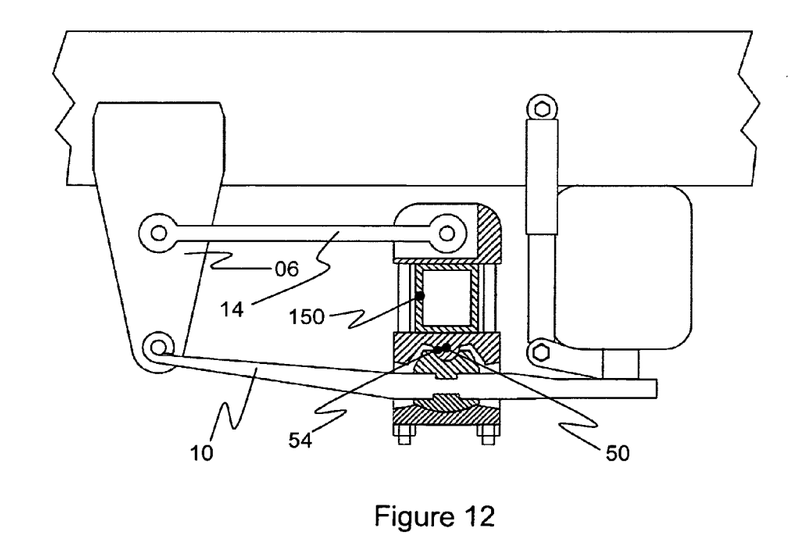

FIG. 12 shows a variant of embodiment in FIG. 11 where the spherical joint center 50 is below axle 150 and above under slung trailing arm. The spherical joint arrangement is similar to that explained in FIG. 11.

Figure 13:
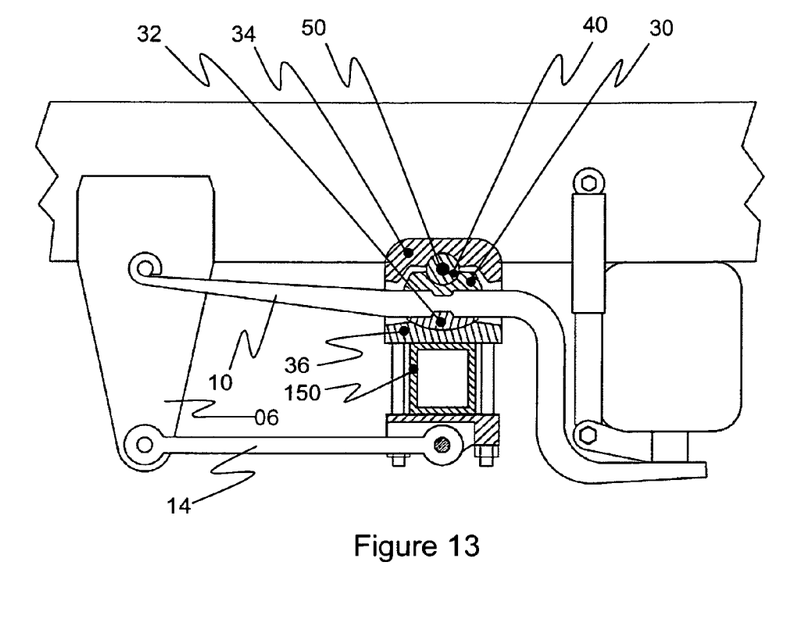

FIG. 13 shows another embodiment of the invention where the spherical joint is formed by 1) spherical segment-top 30, 2) a spherical ball 40, 3) block-top 34, 4) spherical segment-bottom 32 and 5) block-bottom 36. The spherical joint center 50 is above axle 150 and above over slung trailing arm. This arrangement is a variant of that described in 'FIG. 11' in that the spherical projection 54 in block-top is substituted by a spherical ball 40 which cooperatively engages concave spherical surfaces in spherical segment-top 30 and block-top 34.

Figure 14:
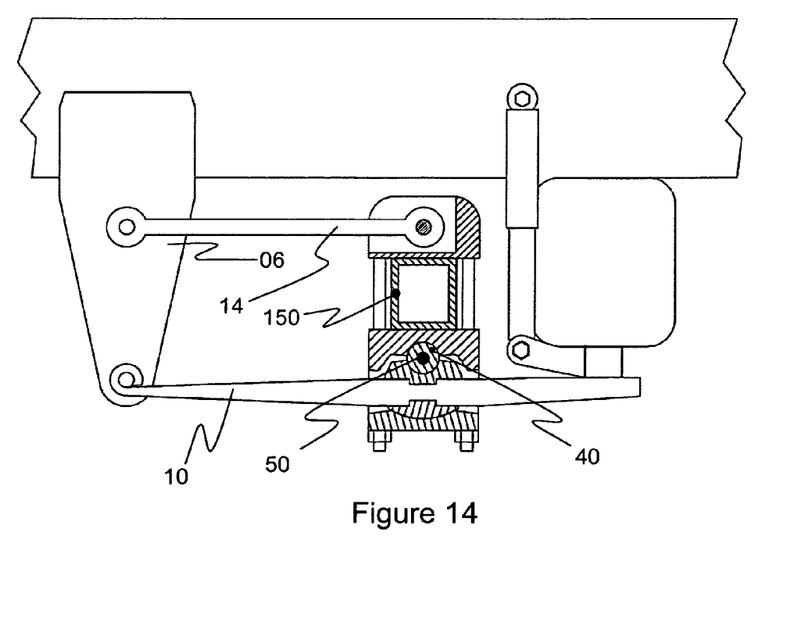

FIG. 14 shows a variant of embodiment shown in FIG. 13 where the spherical joint arrangement is similar to that explained in FIG. 13. Spherical joint center 50 is below axle and above the under slung trailing arm.

Although the above description relates to specific preferred embodiments as presently contemplated by the inventor, it will be understood that the invention in its broad aspect includes mechanical and functional equivalents of the elements described herein.

What is claimed is:

1. A trailing arm air suspension system supporting a vehicle frame, comprising on either sides of the vehicle a trailing arm (09,10) pivoted at its first end (41,42) at top of hanger brackets (05,06), which trailing arms extend in longitudinal direction to axle (150) which axle is connected on its both sides to mid-portion (43,44) of trailing arms (09,10) by spherical joints with centers (49,50), which hanger brackets (05,06) are attached to a pair of oppositely spaced frame rails (03,04) connected by at least one cross member (51), which hanger brackets (05,06) extend vertically below axle axis plane (52), to which hanger bracket is pivotally connected link rods (13,14) at first end of the link rods to bottom end of hanger brackets more towards lower side of axle axis plane (52), link rods extending in the longitudinal direction to axle, second end of link rods pivotally connected to axle below axle axis plane, air springs (23,24) and shock absorbers (25,26) functionally disposed between a second end (45,46) of trailing arms and frame rails (03,04)
  wherein the axle (150) is connected to the trailing arm (09,10) by spherical joint with center (49,50), which spherical joint center is one of four nodes of a four bar mechanism disposed on both sides of axle, which trailing arm bears partial weight of suspended mass at its ends (41,42) and (45,46)
  wherein the trailing arm is a rolled and formed spring steel with a formed pivot hole (59,60 FIG. 5) disposed at its first end (41,42), which pivot and spherical joints with center (49,50) and a trailing arm portion between spherical joint center (49,50) and pivotal joint (11,12), establish one of four links of four bar mechanism, which trailing arm also has a vertically resilient length (57,58).

2. The trailing arm air suspension system of claim 1 wherein a spherical segment-top (29,30) is disposed on top of mid-portion (43,44) and a spherical segment-bottom (31,32) is disposed on the bottom of mid-portion of trailing arm.

3. The trailing arm air suspension system of claim 2 wherein the spherical segment-top (29,30) and spherical segment-bottom (31,32) are contained in corresponding matching spherical cavities in block-top (33,34) and block-bottom (35,36) above and below the trailing arm respectively.

4. The trailing arm air suspension system of claim 3 wherein a spherical ball (40) is used between matching spherical segment-top and block-top as an alternative arrangement to obtain spherical joints with center (49,50).

5. The trailing arm air suspension system of claim 4 wherein bearing bushings interface between spherical segment-top and block-top and between spherical segment-bottom and block-bottom and between spherical ball and block-top and spherical ball and segment-top.

6. The trailing arm air suspension system of claim 5 wherein the block-top (33,34) and block-bottom (35,36) are rigidly connected to the axle by U-shaped bolts (19,21),(20, 22).

7. The trailing arm air suspension system of claim 6 wherein the mid-portion (43,44) and thereby the trailing arm (09,10) is spherically articulated about the spherical joint center (49,50).

8. The trailing arm air suspension system of claim 7 wherein bottom bracket (17,18) is rigidly attached to the axle by U-shaped bolts (19,21),(20,22).

9. The trailing arm air suspension system of claim 8 wherein a first end of the link rod (13,14) is pivotally connected to hanger bracket (05,06).

10. The trailing arm air suspension system of claim 9 wherein second end of link rod (13,14) is pivotally connected to bottom bracket (17,18).

11. The trailing arm air suspension system of claim 10 wherein trailing arms (09,10), spherical segment-top (29,30), spherical segment-bottom (31,32), block-top (33,34), block-bottom (35,36), axle (150), bottom bracket (17,18), U-shaped bolts (19,21),(20,22), link rods (13,14), hanger brackets (05, 06) and pivot pins (11,12),(15,16),(27,28) are geometrically arranged to form a pair of four bar mechanisms one on each lateral side of axle (150).

12. The trailing arm air suspension system of claim 11 wherein the spherical joint center (49,50) is below or above axle axis plane (52).

13. The trailing arm air suspension system of claim 12 wherein the spherical joint center (49,50) is below or above or within mid-portion (43,44) of trailing arm.

14. The trailing arm air suspension system of claim 13 wherein first end of an air spring (23,24) is connected to second end (45,46) of the trailing arm either directly or through an adaptor (38).

15. The trailing arm air suspension system of claim 14 wherein a second end of the air spring (23,24) is connected to frame rail (03,04).

16. The trailing arm air suspension system of claim 15 wherein shock absorber (25,26) is disposed between second end (45,46) of trailing arms and frame rails (03,04).

17. The trailing arm air suspension system of claim 16 wherein pinion shaft angle ($\beta°$) is maintained substantially constant in various vertical positions of axle (150).

18. The trailing arm air suspension system of claim 17 wherein axle (150) is laterally controlled in its lateral travel by a tie rod spherically or pivotally connecting axle (150) to at least one of the frame rails (03 or 04).

\* \* \* \* \*